United States Patent
Colin et al.

(10) Patent No.: US 7,205,022 B2
(45) Date of Patent: Apr. 17, 2007

(54) METHOD AND DEVICE FOR DEPOSITING ADHESIVE ON AN ALVEOLAR SURFACE

(75) Inventors: Bernard Colin, Nantes (FR); Denis De Mattia, Basse Goulaine (FR)

(73) Assignee: Airbus France, Toulouse Cedex 3 (FR)

( * ) Notice: Subject to any disclaimer, the term of this patent is extended or adjusted under 35 U.S.C. 154(b) by 304 days.

(21) Appl. No.: 10/332,055

(22) PCT Filed: Apr. 25, 2002

(86) PCT No.: PCT/FR02/01426

§ 371 (c)(1),
(2), (4) Date: Jul. 7, 2003

(87) PCT Pub. No.: WO02/087855

PCT Pub. Date: Nov. 7, 2002

(65) Prior Publication Data

US 2004/0026034 A1    Feb. 12, 2004

(30) Foreign Application Priority Data

May 2, 2001    (FR)    .................................. 01 05868

(51) Int. Cl.
- B05D 5/10    (2006.01)
- B05D 3/06    (2006.01)
- B32B 37/06    (2006.01)
- B32B 37/12    (2006.01)
- B32B 7/14    (2006.01)

(52) U.S. Cl. ................ 427/208.2; 427/552; 427/207.1; 156/290; 156/291; 156/273.3

(58) Field of Classification Search ........ 427/551–559, 427/557, 207.1, 208.2; 264/242, 248, 259; 156/290, 291, 273.3, 292
See application file for complete search history.

(56) References Cited

U.S. PATENT DOCUMENTS

| 3,656,992 A | * | 4/1972 | Lynam et al. ................ 427/284 |
| 4,155,800 A | * | 5/1979 | Wilson ........................ 156/497 |
| 4,249,974 A |   | 2/1981 | Wilson ........................ 156/85 |
| 5,944,935 A |   | 8/1999 | Zukas et al. ................ 156/285 |

FOREIGN PATENT DOCUMENTS

| EP | 0 439 352 A2 | | 1/1991 |
| GB | 2 104 839 A | | 8/1981 |
| GB | 2104839 A | * | 3/1983 |

* cited by examiner

*Primary Examiner*—Timothy Meeks
*Assistant Examiner*—Cachet I. Sellman
(74) *Attorney, Agent, or Firm*—Thelen Reid Brown Raysman & Steiner LLP

(57) ABSTRACT

A glue film (11) on a cellular structure (10) in order to form a regular glue strip on the edges of the partitions of the cells of the cellular structure (10), and the glue film (11) is exposed to a source (24) that emits radiation adapted to reactivity of the glue to only heat the glue selectively. The glue thus creeps without significantly triggering polymerisation. The glue strip is formed on the ends of the partitions without supplying an air flow through the openings of the cellular structure. The portion of the part located below the source is preferably kept approximately horizontal so that the glue strip is formed under the best possible conditions.

18 Claims, 7 Drawing Sheets

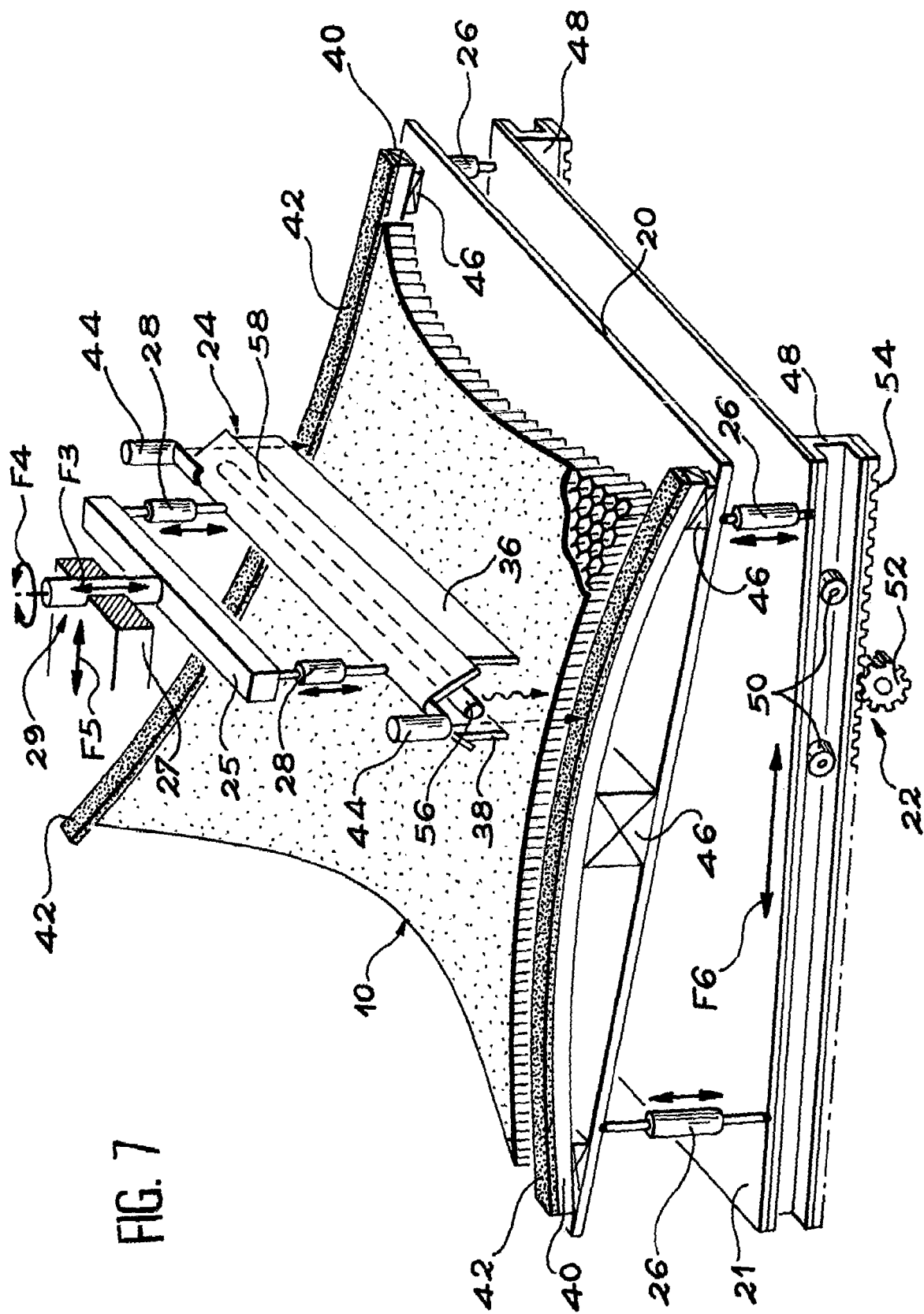

METHOD AND DEVICE FOR DEPOSITING ADHESIVE ON AN ALVEOLAR SURFACE

This application claims priority based on International Patent Application No. PCT/FR02/01426, entitled "Process and Device For Deposition Of Glue On A Cellular Surface" by Bernard Colin et al., which claims priority of French Patent Application Serial No. 01 05868, filed on May 2, 2001.

TECHNICAL FIELD

The invention relates to a process for distributing glue previously deposited on a cellular surface of a cellular material with tubular cells, without obstructing cells opening up from this surface.

The invention also relates to a device using this process.

The process and device according to the invention are advantageously applicable to the manufacture of sandwich panels comprising a cellular core, such as a honeycomb structure with two opposite faces on which the walls forming the outside skin of the panel are glued. These panels are used in many fields, particularly including the aeronautical and space industries.

STATE OF PRIOR ART

Sandwich panels are usually assembled by gluing. In this case, one known method consists of depositing an adhesive film over the surface of the two faces of the cellular core. The walls are then glued on the said faces by contact with this adhesive film. If necessary, a glue polymerisation operation is then applied.

However, there are disadvantages with this known method. The glue then covers the entire two surfaces of the cellular core, including hollow parts of the cells. This makes it impossible to use this method when at least one of the walls of the panel must remain porous after the gluing phase.

Different solutions have been imagined to overcome this problem. All these solutions are aimed at leaving glue only at the ends of cell partitions.

One first known technique is proposed by the MacKAY Industries Company, Inc., U.S.A. This consists of using a hot air flow to heat an adhesive film previously deposited on one of the faces of the cellular core. When a certain temperature is reached, the glue becomes fluid and migrates onto the ends of the partitions of the cells to form a glue strip on them.

This known technique has several disadvantages. Thus, it can only be used satisfactorily on a single face of the cellular core, since the cells have to be open at their opposite end. If the cells are closed, the hot air flow that heats the glue film also heats the air contained in the cells, such that the air expands and causes a back pressure opposing the mechanical action of the hot air flow. Consequently, the glue strip is not uniform and glue may be splashed inside the cells. This can sometimes result in an incomplete glue strip and a risk of closing off a porous wall added on onto the cellular core later, due to subsequent flow of the glue along the partitions of the cells during final polymerisation.

FIGS. 8a, 8b, 8c, 8d and 8e in the appended drawings diagrammatically illustrate cases of an incomplete glue strip (FIG. 8a) and incorrect strips (FIGS. 8b to 8e) that might be obtained by this known process. For comparison, FIGS. 9a and 9b show a regular and uniform glue strip that can guarantee correct assembly of a sandwich panel in a perspective and sectional view respectively.

Another known technique is described in document U.S. Pat. No. 5,944,935. In this case, glue films previously deposited on each of the faces of the cellular core are covered by a porous screen. The assembly is then pressed and heated. The glue films become fluid under the combined effects of temperature and pressure, and migrate into the porous structure of the screens adjacent to the cells, while leaving a glue deposit on the ends of the partitions of the cells. The glue is then cooled using a cooling cylinder and the screen is gradually removed, leaving the glue strips on the ends of the partitions of the cells.

This other known technique also has several disadvantages. Firstly, it is long and complex to implement since it includes many additional operations compared with other known gluing methods (placement of porous screens, application of pressure, cooling, removal of screens, etc.). Furthermore, this technique is more expensive than other known methods since it also needs more glue. A thicker glue film is necessary because a large part of the glue is removed with the porous screens. Furthermore, this induces a large quantity of waste (glue and screens) which creates problems with the environment. Furthermore, as in the previous technique, heating of the cellular core can cause deformations of the core, particularly in the case of complex shapes. Finally, this technique is difficult to apply to non-plane surfaces, for example concave or convex spherical shaped surfaces.

PRESENTATION OF THE INVENTION

The purpose of the invention is a process to obtain a regular and uniform glue strip adapted to the required performances, on the ends of the partitions of open or closed cells of a cellular surface, regardless of the shape of the said surface, in other words equally well on a simple shaped cellular surface and on a complex shaped surface such as a non-adjusted and/or non-developable surface.

In this respect, a process is proposed to obtain a glue strip on the ends of cell partitions opening up onto a surface of a cellular structure, according to which a glue film is deposited on the said surface, characterized in that the glue film is then exposed to a source emitting radiation adapted to the glue reactivity to heat it only selectively, so that it can creep without significantly triggering polymerisation.

The expression "without significantly triggering polymerisation" covers the case in which polymerisation is slightly triggered, to prevent the glue from flowing during subsequent gluing and to guarantee mechanical performances of the glued assembly. In particular, this prepolymerisation may be envisaged when the viscosity of the glue used is low.

This process selectively and uniquely heats the glue to a sufficiently high temperature to make it creep and migrate forming a strip on the ends of the partitions of the cells, and to pre-polymerise it if necessary (as a function of the viscosity, wetting characteristics, etc.). It may then be used indifferently on any shape of cellular surface, even if it is a complex shaped surface.

In one preferred embodiment of the invention, the glue film is exposed to a flux output from the source for a duration and at a power adapted to the reactivity of the glue.

In this case, the power of the source, the distance between the source and the cellular structure, and the relative displacement velocity between the source and the cellular structure are advantageously controlled using a servo control sensitive to at least one temperature measurement made on the said structure.

Advantageously, the glue film is exposed to the source when the surface of the cellular structure is facing upwards, preferably keeping the partitions of the cells approximately vertical. This arrangement ensures that the glue strip is formed as uniformly as possible on each side of the ends of the cell partitions.

According to one preferred embodiment of the process according to the invention, a glue film is applied in which at least one hole is formed facing each of the cells of the cellular structure. This characteristic facilitates triggering of creep of the glue, and consequently formation of the strips.

Preferably, the holes formed in the glue film then have an approximately circular cross section and their diameter is not uniform throughout the thickness of the film.

If the cells form a regular hexagonal network, the holes are then distributed in the glue film according to a regular network with a triangular pitch.

Another purpose of the invention is a device to form glue strips on the ends of cell partitions opening up onto a surface of a cellular structure, this device being characterized in that it comprises a source that may be arranged facing the said surface on which a glue film has already been deposited, the said source being capable of emitting radiation chosen to selectively heat the glue only, so that it creeps without significantly triggering its polymerisation.

According to a first embodiment of the invention, the source is fixed and the support of the cellular structure can be displaced to make the surface of the cellular structure move in front of the source at an approximately constant spacing.

According to a second embodiment of the invention, the support is fixed and the electromagnetic source is capable of moving parallel to the surface of the cellular structure.

According to a third embodiment of the invention, used in the case in which the surface of the cellular structure is not plane, the support can be oriented and the source can be displaced facing the said surface along a trajectory keeping an approximately constant separation from the face.

In the various embodiments of the invention, the source is advantageously capable of moving along a direction approximately normal to the surface of the cellular structure. This guarantees homogeneity of exposure to radiation emitted by the source over the entire surface of the cellular structure.

The upstream and downstream screens may be associated with the source for a similar purpose, in order to limit dispersion of the flux emitted by the source. These screens may be reflective or non-reflective.

In order to precisely measure the temperature reached by the glue film on the cellular structure, the support advantageously comprises at least a smooth lateral part, in other words with no cellular structure, onto which a control glue film identical to the glue film placed on the said structure can be applied directly. Temperature measurement means are then placed facing the said smooth lateral part.

In this case, a temperature resistant adhesive tape is advantageously placed on the smooth lateral part on which the control glue film will be placed. The adhesive tape can be removed at the end of the operation and used as a means of keeping a trace of the application conditions.

BRIEF DESCRIPTION OF THE DRAWINGS

We will now describe different embodiments of the invention as non-limitative examples, with reference to the appended drawings, wherein;

FIG. 7 is a perspective view that shows a device comparable to that illustrated in FIG. 5, used for the treatment of a complex shaped structure, in more detail;

DETAILED DESCRIPTION OF SEVERAL PREFERRED EMBODIMENTS OF THE INVENTION

Figure 1:
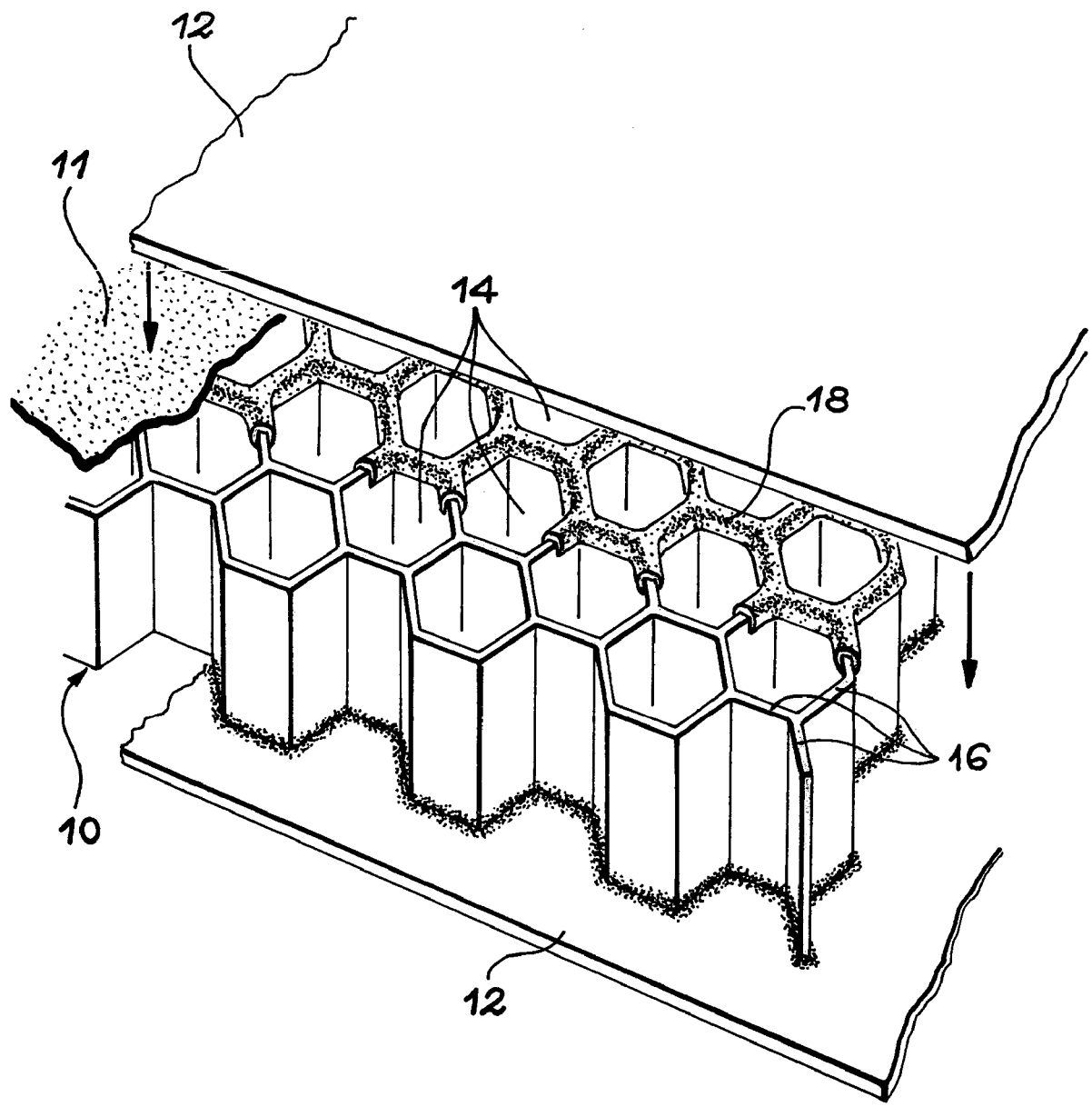
FIG. 1 is a perspective view with a partial tear out, representing a sandwich panel obtained by use of the process according to the invention.

As illustrated diagrammatically in FIG. 1, a sandwich panel that can be made by the process according to the invention usually comprises a cellular structure 10 forming the core of the panel, and two walls 12 added on by gluing each face of the structure 10.

The cellular structure 10 is in the form of a wafer that may or may not be plane, and may have parallel or non-parallel faces, without departing from the scope of the invention. This structure includes a large number of cells 14 separated from each other by partitions 16. Usually, the partitions 16 are oriented so as to be perpendicular to the two faces of the structure 10 and the cells 14 pass through it from one side to the other opening up on each of the two faces. However, this arrangement must not be considered to restrict the scope of the invention. The invention is also applicable to cases of a cellular structure in which the partitions 16 are not perpendicular to the faces of the structure and in which the cells 14 only open up at one of the said faces.

As shown diagrammatically in FIG. 1, the cellular structure 10 is usually in the form of a "honeycomb" structure, in which the cells have a hexagonal cross-section. However, the cells of the structure 10 could have a different cross section, for example square or rectangular, without departing from the scope of the invention.

The wall or walls 12 that are provided on the surface of at least one of the faces of the cellular structure 10 may be of any nature and may have a porous or non-porous structure depending on the envisaged application. In particular, each wall 12 may be composed of a thin metallic wafer or may consist of the superposition of several layers of woven or non-woven fibres impregnated with resin, using an arrangement well known to those skilled in the art.

According to the invention, each wall 12 is added onto the corresponding face of the cellular structure 10 by gluing. More precisely, the first step is to deposit a glue film 11 over the said face which is then in the form of a flexible sheet with zero adhesion or relatively low adhesion at ambient temperature. Due to the process according to the invention, this glue film 11 is heated such that the glue creeps and migrates without significantly polymerising, onto the ends of the partition 16 materializing the surface of the cellular structure 10. The glue thus forms a strip 18 on the ends of the partitions 16. The wall 12 is then placed on the surface of the considered face of the structure 10, so that it can be glued onto it during a subsequent polymerisation step. This polymerisation step is well known to those skilled in the art, and consequently it will not be described herein.

The process according to the invention more precisely relates to the step for heating the glue film 11, so that the glue strip 18 is obtained on all ends of partitions 16 materializing the corresponding face of the structure 10.

According to this process, the glue film 11 is heated by radiation using an adapted power source, so that the glue is then only heated selectively. The glue is chosen in advance to satisfy the mechanical, physical, chemical characteristics, etc., required for the envisaged application. At least most of the energy radiated by the source is absorbed by the glue, without being significantly absorbed by the cellular structure.

In practice, the source only heats the glue because the source characteristics are chosen as a function of the glue characteristics to satisfy the conditions as described above. In particular, this avoids the need to heat the partitions 16 of the cells 14 and the air that they contain. Furthermore, the thermal inertia is very low. Therefore, there is almost no risk that the glue will be splashed inside the cells or that the strip 18 is incomplete.

As an example which in no way limits the scope of the invention, a source emitting in the infrared may be used for a thermosetting epoxy type glue.

When the process according to the invention is used, the power of the source, the distance separating it from the surface of the cellular structure and the exposure time, are determined as a function of the reactivity of the glue, such that the temperature reached by the glue is sufficient for it to creep, without significantly triggering polymerisation. The glue can thus creep and migrate under the effect of capillarity forces to form the strip 18, without significantly increasing the temperature of the cellular structure 10, since essentially the glue is heated by radiation of the source. Therefore, the exposure duration/temperature pair is defined as a function of the rheological characteristics and polymerisation kinetics of the glue.

In addition to the risk of polymerisation of the glue beginning due to the use of an excessive creep temperature, such an excessive temperature would also cause the glue to flow along the partitions of the cells and consequently result in a lack of glue where it should have been deposited. Tests carried out in advance will optimise the glue exposure parameters in each special case.

Different parameters such as the velocity of the relative displacement between the source and the cellular structure (in other words the exposure time of the glue film), the distance between the source and the structure and the power of the source, will advantageously be servo controlled in order to control conditions for the formation of glue strips at the ends of the cells in real time.

Thus the glue temperature, for example measured using optical pyrometers, is automatically held at a sufficient value so that the glue creeps and migrates, but is not sufficient to begin polymerisation of the glue too early. The temperature may be controlled by varying the power of the source and/or its average distance from the glue film. The advance velocity is controlled such that the exposure duration is sufficient to enable the glue to creep and migrate in the form of a strip, but is also short enough so that the polymerisation process is not significantly triggered.

Figure 9A:
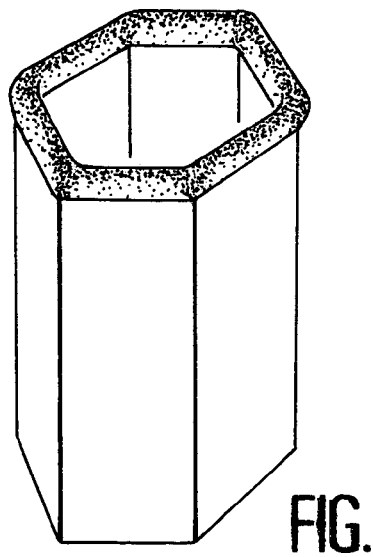
FIGS. 9a and 9b are perspective and sectional views respectively, showing regular and uniform glue strips obtained according to the invention.
Figure 9B:
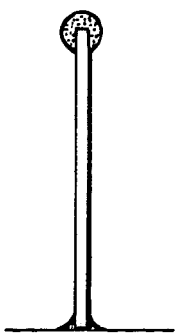

The glue film 11 is exposed to the source while the corresponding face of the cellular structure 10 is facing upwards, so that creep can take place under optimal conditions capable of guaranteeing the formation of a uniform strip 18, in other words symmetrical or approximately symmetrical with respect to the planes of the partitions 16 (FIG. 9*b*). Furthermore, the said structure is oriented such that the partitions 16 of the cells 14 are approximately vertical at least in the part of the cellular structure 10 facing the source when the said structure is not plane. The absorption efficiency of the radiation emitted by the source is optimised as a result of this arrangement in which the direction of radiation of the source is oriented normal to the surface of the part.

The process according to the invention has many advantages. Thus, since the cellular structure is not heated, there is no risk that it will deform. Therefore, the glue may be deposited on structures that may have a complex shape. Furthermore, the air contained in the cells does not expand since it is not heated. Therefore, there is no risk of the glue strip 11 bursting and the glue splashing, even if the cells are closed on the other face of the structure. Furthermore, the absence of any direct mechanical action of the device on the part being manufactured is a means of avoiding the creation of parasite effects such as deformations of the part, pollution or deterioration to its surface, etc. Furthermore, the process is easy to implement and enables significant time savings compared with processes according to prior art. It does not lead to any waste and only uses the strictly necessary quantity of glue. Finally, the process according to the invention may be used in sequence on the two faces of a cellular structure.

Different embodiments of devices designed to implement the process that has just been described will now be briefly presented, with reference to FIGS. 2 to 7 in sequence.

Figure 2:
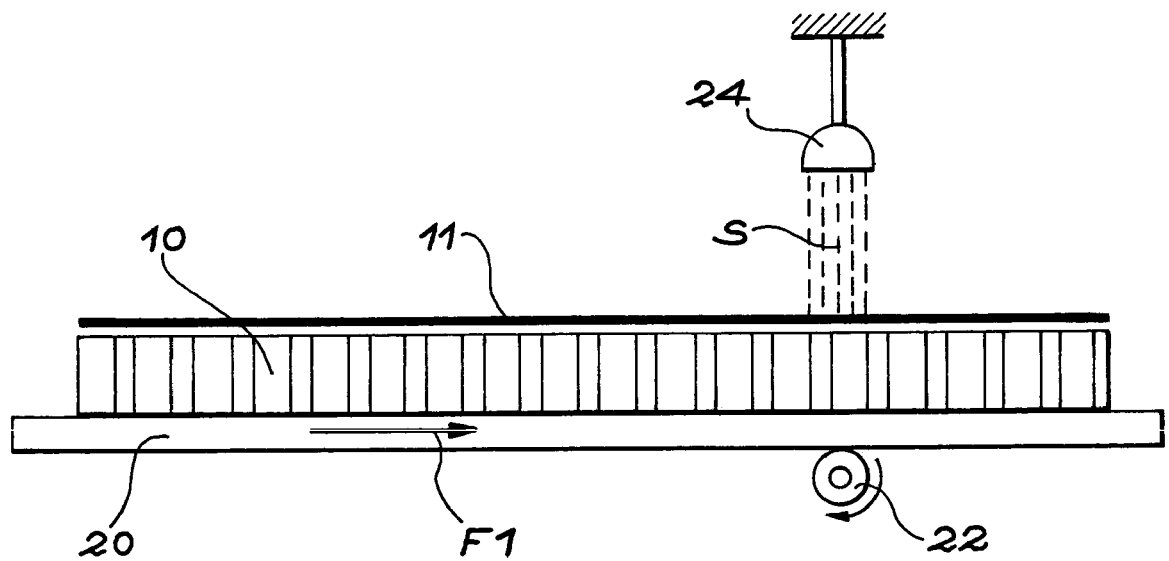
FIG. 2 is a side view that diagrammatically shows a first embodiment of a device conform with the invention.

FIG. 2 diagrammatically shows a first embodiment of a device conform with the invention. This device comprises a support 20 with a shape and dimensions adapted to the cellular structure 10, in which the ends of the walls of the cells are to be covered with glue strips. The case of a plane structure is illustrated, to make the description simpler. As will be seen later, this embodiment is not limited to this type of cellular structure and may also be used in the case of non-plane structures.

The support 20 is provided with drive and guidance means, diagrammatically illustrated in 22 in FIG. 2. These drive and guidance means 22 are used to displace the support 20 and the structure 10 that it supports along a trajectory, which in this case is approximately straight and horizontal (arrow F1). In the case of a non-plane part, this trajectory may be significantly different as will be understood later.

The device diagrammatically illustrated in FIG. 2 also comprises a source 24. As will be seen in more detail later, the source 24 comprises the source itself, which for example is in the form of one or several emitting tubes placed end to end, and one or several reflectors directing radiation in the required direction.

In one variant embodiment, the distance and orientation of each tube with respect to the cellular structure may be adjusted independently of the distance and orientation of the other tubes, such that the source considered as a whole is then in non-linear form. For example, this arrangement is particularly advantageous in the case of spherical cellular structures. The source itself may also be deformable or have a shape adapted to the shape of the part.

The source 24 is installed in a fixed manner above the support 20 and is oriented vertically downwards, so that it can emit radiation S with the characteristics defined above towards the cellular structure 10 placed on the support 20.

When the device diagrammatically illustrated in FIG. 2 is used, the structure 10 is coated with a glue film 11 and it moves under the source 24 by activating the drive and guidance means 22. The arrangement of these means is such that the spacing between the source 24 and the facing part of the structure 10 remains approximately constant and that the radiation S emitted by the source is always approximately normal to the said part. Servo control of the advance velocity of the structure 10 in front of the source 24, the power of the source and the distance between the source 24 and the structure 10, optimise operation to obtain the required temperature for creep of the glue. As already mentioned, exposure of glue to radiation from the source must be adapted to the reactive properties of the glue. In particular, it may be regulated by a servo control system or in relation to prior learning.

Since only the glue is heated by absorption of the emitted energy, the thermal inertia is very low and the structure on which the glue strip is formed very quickly returns to ambient temperature. If applicable, a cooling system (not shown) may also be provided on the output side of the part of the cellular structure 10 facing the source 24. For example, this cooling system is then of the ventilation or suction type and may be equipped with screens to direct the effect of ventilation towards the structure.

In one variant of this first embodiment (not shown) that will be used for making small parts, the entire surface of the glue film placed on the cellular structure 10 is heated by the source 24, without it being necessary to move this structure. The device can then include a support 20 that is also fixed.

Figure 3:
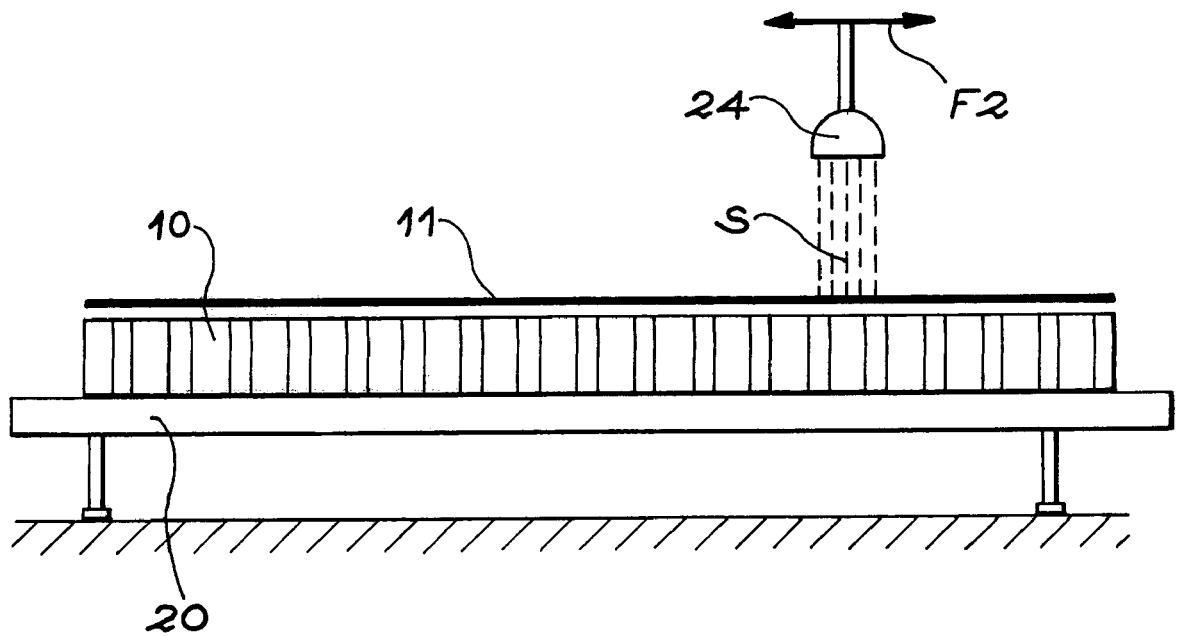
FIG. 3 is a view comparable to FIG. 2 that diagrammatically shows a second embodiment of the invention.

In a second embodiment of the device according to the invention illustrated diagrammatically in FIG. 3, the support 20 supporting the cellular structure 10 is fixed. This embodiment essentially concerns the case in which the surface of the cellular structure 10 facing the source 24 is plane, or approximately plane. The source 24 then moves above the structure 10 along a trajectory such that the spacing between the source and the said structure remains approximately constant. The upper face of the structure 10 in this case is approximately plane and horizontal, which means that the trajectory followed by the source 24 is straight and horizontal (arrow F2).

Figure 4:
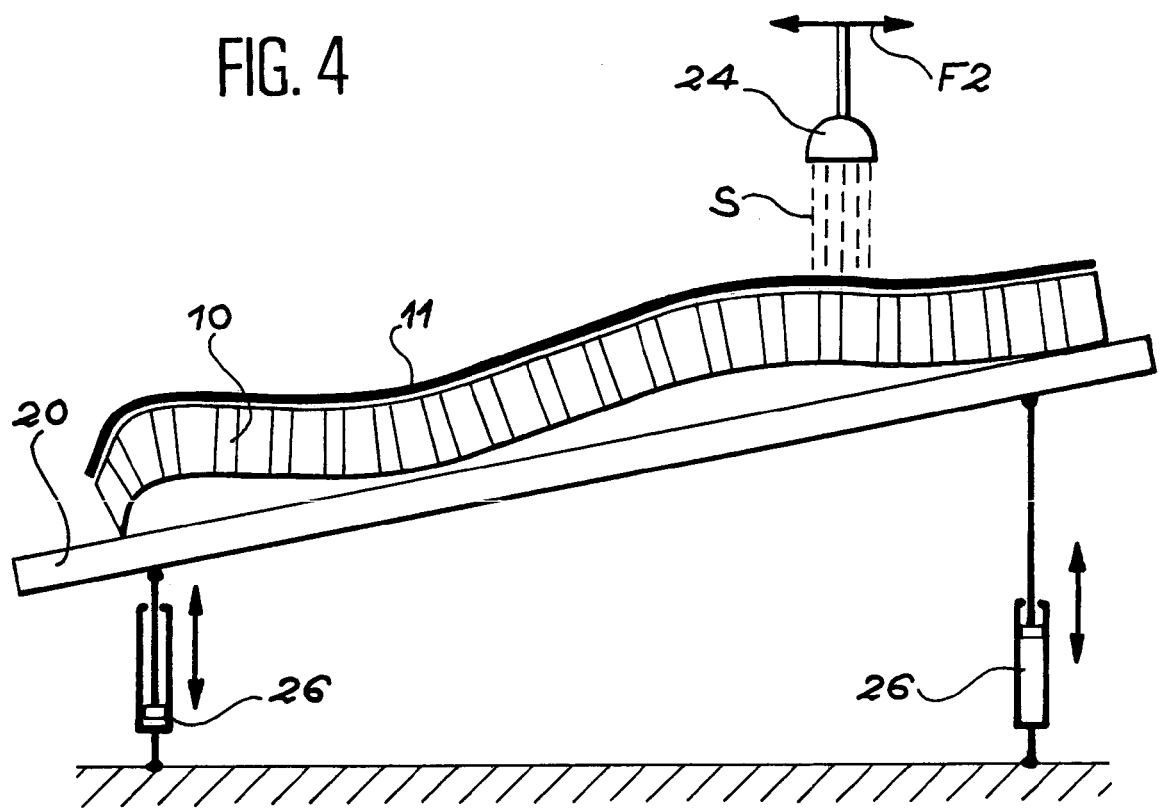
FIG. 4 is a view comparable to FIGS. 2 and 3 that diagrammatically shows a third embodiment of the invention.

FIG. 4 diagrammatically shows a third embodiment of the device according to the invention. This embodiment is an extension of the previous embodiment, in the case in which the top face of the cellular structure 10 is not plane.

As in the embodiment that has just been described with reference to FIG. 3, the source 24 moves along a straight and horizontal trajectory (arrow F2) above the top face of the structure 10. However, instead of being fixed, the support 20 on which it is installed comprises means of orientation, diagrammatically illustrated in the form of jacks 26 in FIG. 4. These orientation means keep the part of the top face of the structure 10 located facing the source 24 approximately horizontal and at an approximately constant distance from the source 24. The orientation means 26 may be any shape useful to obtain the required result. Advantageously, they are used under the control of a servo control system (not shown) sensitive to signals output by sensors making measurements such as temperature measurements on the cellular structure.

Figure 5:
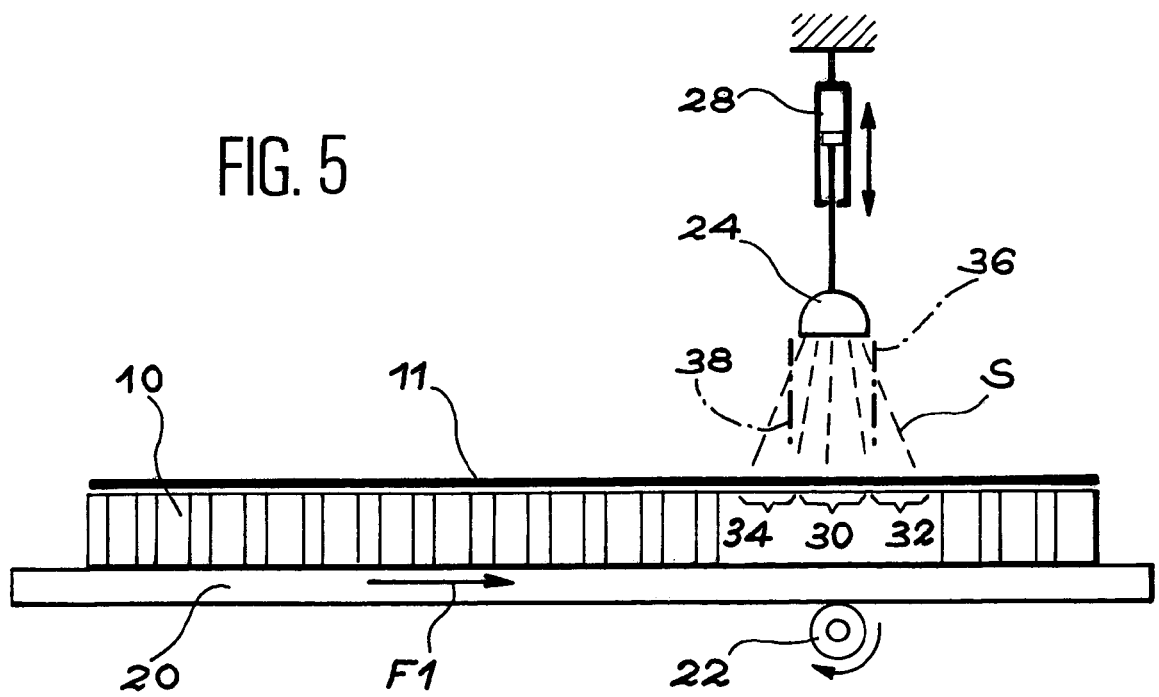
FIG. 5 is a view comparable to FIGS. 2 to 4, that diagrammatically shows a variant of the embodiment in FIG. 2.

FIG. 5 diagrammatically shows a variant of the first embodiment of the invention described above with reference to FIG. 2. However, note that this variant is also applicable to the two other embodiments that have just been described with reference to FIGS. 3 and 4.

The variant embodiment in FIG. 5 is a means of correcting disadvantages due to the fact that in practice, the source 24 is neither perfectly point, or at the focus of a perfectly parabolic reflector. Consequently, the radiation beam emitted by the source is not perfectly parallel and homogenous. Therefore, there are two zones 32 and 34 of diffuse and attenuated radiation on the upstream and downstream sides of the zone 30, in which the glue is exposed but to a lesser extent than in zone 30. Therefore, if the distance between the source and the top face of the cellular structure is not approximately constant over the entire surface of the structure, the absorbed energy quantity and consequently the temperature will not be homogenous over the entire surface.

For some applications, this phenomenon does not jeopardise smooth operation of the process. The devices described above with references to FIGS. 2 to 4 can then be used without modification.

On the other hand, in some applications, radiation dispersion disturbs smooth operation of the process. As shown in the form of jacks 28 on FIG. 5, means can then be inserted between the source 24 and the fixed frame of the device, so that the distance separating the source 24 from the surface facing the cellular structure 10 can be varied at will. A servo control then moves the source 24 vertically, so as to keep the above mentioned distance approximately constant. In particular, this servo control may be controlled in response to signals output by distance sensors (not shown) carried by the source and/or temperature sensors placed close to the source. This guarantees uniformity of exposure over the entire surface of the part to be treated.

In another variant embodiment shown in chain dotted lines in FIG. 5, the "parasite" exposure areas 32 and 34 are reduced by adding upstream 36 and downstream 38 screens to the source 24. These screens may or may not be reflecting and may or may not be parallel to the radiation beam emitted by the source, or they may be oriented obliquely with the respect to this beam, and limit dispersion of the flux. They are located at a suitable distance from the structure 10.

Figure 6:
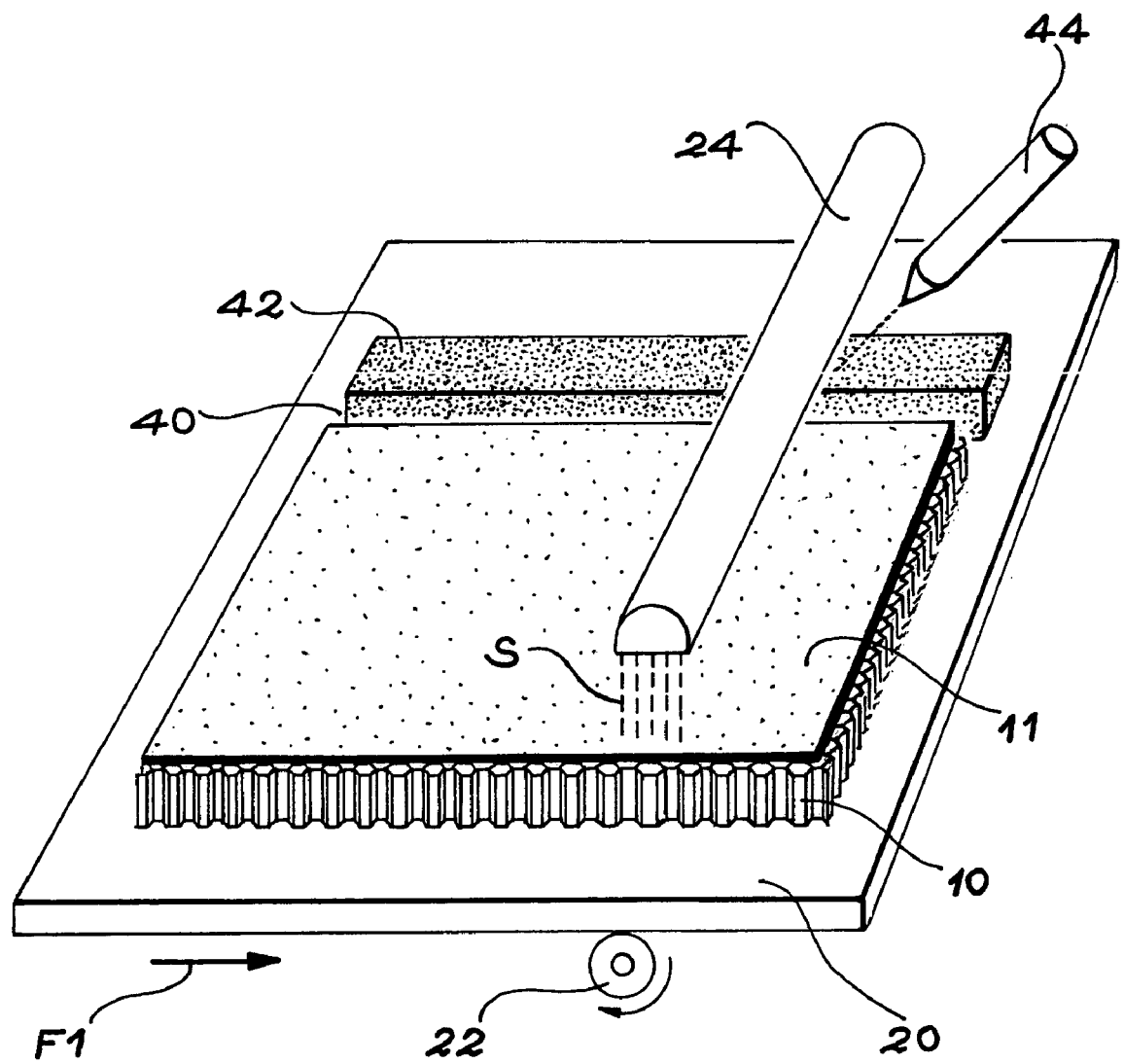
FIG. 6 is a perspective view that diagrammatically illustrates the arrangement of a temperature measurement system on the device in FIG. 2.
Figure 8A:
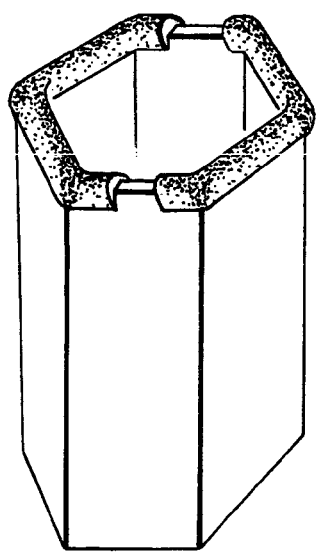
FIGS. 8a, 8b, 8c, 8d and 8e, described above, are perspective (FIG. 8a) and sectional (FIGS. 8b, 8c, 8d and 8e) views that represent defective glue strips obtained by processes according to prior art.
Figure 8B:
Figure 8C:
Figure 8D:
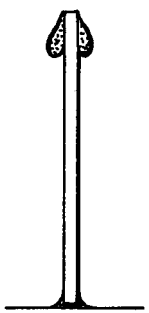
Figure 8E:
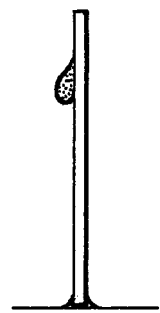

FIG. 6 diagrammatically shows an optional advantageous improvement to the device according to the invention. In the case in FIG. 6, this improvement is applied to the first embodiment described above with reference to FIG. 2. However, this improvement may be used indifferently in all embodiments and variants of the invention.

As shown in FIG. 6, the support 20 on which the cellular structure 10 is installed then also includes at least one side part 40 which is smooth and on which a control glue film 42 is placed identical to the glue film 11 placed on the top face of the structure 10. A side part 40 is then arranged along at least one of the side edges of the cellular structure, so as to extend over the entire length of the structure parallel to the direction of relative displacement between the support 20 and the source 24 (in FIG. 6, this direction corresponds to displacement of the support 20 and is illustrated by the arrow F1).

The face of each side part 40 on which the control glue film 42 is placed faces towards the source 42. Furthermore, this face is smooth and is located at approximately the same level as the top face of the cellular structure 10. Each control glue film 42 is thus scanned by the radiation emitted by the source 24 under the same conditions as the glue film 11 placed on the structure 10. Therefore, the temperature of the control glue film 42 is representative of the temperature obtained on the glue film 11 covering the cellular structure.

As also illustrated in FIG. 6, temperature measurement means, for example such as at least one optical pyrometer 44, are installed close to the source 24. The optical pyrometer 44 measures the temperature obtained on the contact free control glue film 42. Since the side part 40 is solid, the temperature of the control glue film 42 may be measured precisely and under good conditions, which would not be the case if the measurement was made directly on the glue film 11 placed on the structure 10, due to the holes that are formed in this film due to creep.

The temperature information thus obtained may be used for different purposes. One first possible use is for monitoring, recording and printing the temperature cycle applied to the part (traceability). One other possible use would be to regulate the temperature of the glue film by varying the power of the flux emitted by the source. Finally, the temperature information could be used to regulate the temperature by varying at least one of the magnitudes consisting of the velocity of relative displacement between the support 20 and the source 24, and the distance between the source and the part.

Advantageously, an adhesive tape resistant to the temperature applied to the glue may be inserted between the lateral part 40 and the control glue film 42. This adhesive tape then makes it easier to remove the control glue film from the side part 40 after its exposure. At least part of the adhesive tape covered with glue can then be kept to keep a trace of part manufacturing conditions.

FIG. 7 shows an example of an industrial embodiment of the device according to the invention, in more detail. More precisely, this example combines embodiments and variants described above with reference to FIGS. 2, 4 and 5, in the case in which the manufactured part has a non-developable and non-adjusted cellular surface.

FIG. 7 shows the support 20 on which the cellular structure 10 is fixed by shims 46 and conventional clamping means (not shown). The (optional) shims 46 are used to install different shaped structures 10 on a single support 20.

The support 20 is itself supported by a mobile frame 21, through orientation means illustrated diagrammatically in the form of jacks 26. The use of these orientation means is a means of continuously maintaining the portion of the upper face of the structure 10 exposed to radiation from source 24 in an approximately horizontal orientation at an approximately constant distance from the source 24.

FIG. 7 also shows drive and guidance means 22. In this case, these means comprise two rails 48 fixed on the lower face of the mobile frame 21, wheels 50 supported by the fixed frame (not shown) of the device and cooperating with the rails 48, a drive gear 52 engaged on a toothed wheel 54 formed on one of the rails 48, and a motor (not shown) to drive the gear 52.

FIG. 7 also shows the source 24. This source comprises one or several tubes 56 forming the actual source, a parabolic reflector 58 that directs radiation emitted by tube 56 towards the top face of the structure 10, and the upstream 36 and downstream 38 screens as described previously with reference to FIG. 5.

The source 24 is connected to a mobile wafer 25 by two jacks 28. The mobile wafer 25 itself is installed on a moving carriage 27 through a mechanism 29 enabling vertical displacement (arrow F3) and rotation (arrow F4) of the said wafer about a vertical axis. Finally, the moving carriage 27 is installed on the fixed frame of the device so that it can move along a translation direction illustrated by the arrow 5 in FIG. 7.

The vertical displacement (arrow F3) of the wafer 25 is used to adjust the distance that separates the source 24 from the surface of the structure 10. Use of the jacks 28 maintains an approximately constant mean distance between the source 24 and the top face of the cellular structure 10, when the said face is not plane. The rotation (arrow F4) of wafer 25 is used to orient the source 24 along the generating lines of the cellular structure, when the cellular structure has a complex shape. Finally, translation of the carriage 27 along the direction of the arrow F5 is a means of moving the source 24 over the entire surface of the part.

In the arrangement that has just been described, the drive and guidance means 22 are used to displace the cellular structure 10 coated with a glue film under the source 24 (arrow F6) so as to gradually increase the temperature of the assembly thus formed. The presence of the jacks 26 is a means of presenting the part of the said assembly located under the active area of the source 24, in an approximately horizontal position. Thus, the partitions of the cells are in an approximately vertical position when the glue film that covers them is heated by the absorption of radiation emitted by the source.

The device shown in FIG. 7 also comprises two smooth side parts 40 of the support 20, conform with the improvement described above with reference to FIG. 6, on which a control glue film 42 is deposited, together with two temperature measurement means such as optical pyrometers 44 fixed to the source 24 and oriented towards each of the side parts 40 respectively.

A non-perforated glue film 11 is used in the different embodiments described.

On the other hand, a perforated glue film 11 is used in an advantageous improvement to the invention. This embodiment is diagrammatically illustrated in FIG. 10 in the special case of a cellular structure 10 in which the cells 40 form a regular hexagonal network.

More precisely, the glue film 11 is perforated in this case by at least one hole 11a facing each of the cells 40 of the cellular structure 10. The holes 11a are intended to facilitate migration of glue towards the ends of the partitions 16 of the cells 14.

However, the number, arrangement and dimensions of holes 11a are determined so as to facilitate initiation of creep of the glue, while keeping a sufficient quantity of glue in each of the cells 14 to make the strips 18 (FIG. 1). When the size of the holes 11a is increased, the quantity of glue contained in the glue film becomes smaller. In practice, good results are obtained if the average diameter of the holes 11a is approximately equal to 1 mm, but other dimensions may be suitable.

In practice, the shapes of the holes 11a are not cylindrical and prismatic, to facilitate migration of glue from the different holes towards the ends of the partitions of the cells when the film is heated. In particular, they are usually circular, but their diameters are not uniform over the thickness of the glue film. As a non-restrictive example, the holes 11a may in particular be tapered. The expression "average diameter" used above takes account of the fact that the holes 11a preferably have a shape other than a cylinder with the circular cross-section.

When the cellular structure 10 has an approximately plane surface to be glued and cells 14 in line and arranged according to a regular network, it is possible to be sure that there is at least one hole 11a facing each of the cells 14 using a glue film 11 through which holes 11a are perforated arranged according to a regular network, for which the spacing pitch corresponds to the pitch of the cells 14 along the two directions of the plane surface to be glued.

Figure 10:
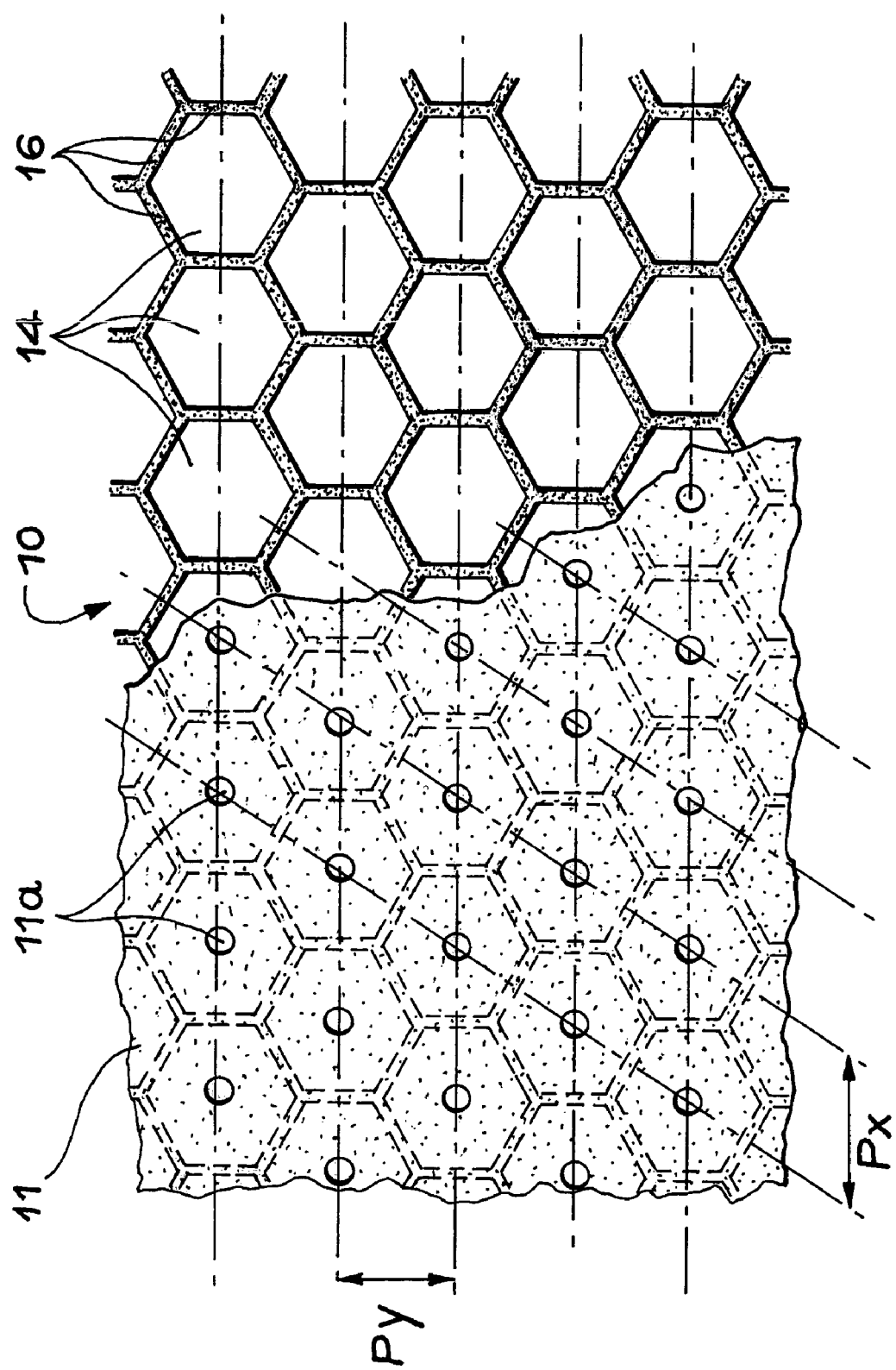
FIG. 10 is a top view that diagrammatically illustrates an improvement to the invention, according to which a perforated adhesive film is used in association with a cellular structure in which, in this special case, the cells form a regular hexagonal network.

FIG. 10 illustrates this arrangement, in the special case of a cellular structure 10 in which the cells 14 are arranged according to a regular hexagonal network. In this case, the holes 11a are arranged according to a regular triangular shaped network, in which the pitch is equal to the pitch of the network formed by the cells 14.

In many cases, the cellular structure is flexible and deformable. Furthermore, some parts to be made are not plane. The consequence of all these arrangements is that the cells 14 are not perfectly aligned. In this case, the use of a glue film like that described in the previous section is not sufficient to guarantee the presence of a hole 11a facing each of the cells 14 of the structure.

In order to satisfy the above mentioned contradictory requirements, a glue film 11 is then used in which the holes are arranged such that for most of the cells, the number of holes facing them is less than or equal to 3 and equal to at least 1. If there are too many holes corresponding to a single cell there is a risk that the glue will migrate irregularly around the perimeter of the end of this cell, particularly if the holes were located close to the ends of the partitions of this cell.

The glue migrates more homogenously if the hole(s) is or are located close to the centre of the end of the cell considered. By limiting the number of holes facing each cell to approximately three, good distribution of the glue and consequently good subsequent gluing of the wall on the cellular structure, is achieved.

When several holes (for example 2 or 3) correspond to the same end of a cell, glue threads can remain in the said end after the creep and migration operation of the glue. However, this is not a problem since in most cases, these threads fluidise and break, and glue then migrates towards the edges of the cells during the polymerisation step corresponding to gluing the partition onto the cellular structure.

Many tests carried out for the purposes of this improvement have defined an optimum arrangement of the holes 11a, even for the case of a deformed or curved structure. These tests have been carried out on honeycomb structures made by "Eurocomposite" or "Hexcel", comprising approximately hexagonal cells with dimensions such that the diameter of the inscribed circle in each of the cells is equal to approximately 9.5 mm (⅜ inches). The glue film used was of the thermosetting type made by "3M", reference AF191.U.

The optimum arrangement of the holes 11a formed due to these tests is illustrated in FIG. 10. Thus, the holes 11a are arranged in two directions with an angle of 60° between them, in other words along a regular network with a triangular shaped pitch.

In the estimated example considered in the tests, the holes 11a have a spacing with a pitch Px equal to approximately 7 mm along a first direction. The spacing of the holes 11a along the second direction is such that the projection Py of the pitch separating them onto a straight-line perpendicular to the first direction is equal to approximately 4.5 mm. The result obtained with this range is satisfactory since fewer than three cells remain blocked by the glue film on a panel larger than 1 square meter.

For a cellular structure in which the cell sizes are different, a glue film perforated with holes arranged in a similar manner will be used, by applying a proportionality factor to the values of the pitch Px and the distance Py given in the previous section.

The invention claimed is:

1. Process to obtain a glue strip on the ends of the partitions of cells opening up onto the surface of a cellular structure, comprising:
    applying a glue film on said surface; and
    exposing the glue film to a source emitting radiation adapted to the reactivity of the glue to only heat the glue selectively so that the glue creeps without significantly triggering its polymerization,
    wherein the glue strip is formed on the ends of the partitions without bursting the glue film.

2. Process according to claim 1, wherein the glue film is exposed to the source for a duration and at a power adapted to the reactive properties of the glue.

3. Process according to claim 2, further comprising:
    controlling the power of the source, the distance between the source and the cellular structure, and the relative displacement velocity between the source and the cellular structure using a servo control sensitive to at least one temperature measurement made on the said structure.

4. Process according to claim 1, wherein the glue film is exposed to the source while the surface of the cellular structure is facing upwards.

5. Process according to claim 1, wherein the glue film is exposed to the source while keeping the partitions of the cells approximately vertical.

6. Process according to claim 1, wherein a glue film is used in which at least one hole is perforated facing each of the cells of the cellular structure.

7. Process according to claim 6, wherein a glue film is used in which approximately circular holes are formed, with a non-uniform diameter over the thickness of the said film.

8. Process according to claim 6, wherein the said cells forming a regular hexagonal network, and a glue film is used in which holes are formed distributed along a regular network with a triangular shaped pitch.

9. Device to obtain the formation of glue strips on the ends of the partitions of cells opening onto the surface of a cellular structure, said device comprising a source adapted to be placed facing said surface, on which a glue film has been deposited in advance, said source being capable of emitting radiation chosen to heat the glue only selectively, so that the glue creeps without significantly triggering its polymerization, wherein said device is adapted to form the glue strip on the ends of the partitions without bursting the glue film.

10. Device according to claim 9, further comprising a support adapted to place the cellular structure thereon said structure being arranged such that the said surface is facing upwards.

11. Device according to claim 9, wherein said support is adapted to arrange the structure such that the partitions of the cells are approximately vertical.

12. Device according to claim 9, wherein the source is fixed, and the support of the cellular structure is adapted to move to make said surface move in front of the source with an approximately constant spacing.

13. Device according to claim 9, wherein the support is fixed and the source is capable of moving parallel to the said surface of the cellular structure.

14. Device according to claim 10, applicable when said surface is not plane, wherein the support is adapted to be rotated, and the source is adapted to be displaced facing said surface among the trajectory and with an approximately constant spacing therefrom.

15. Device according to claim 9, in which the source is capable of moving along a direction approximately normal to said surface.

16. Device according to claim 12, wherein upstream and downstream screens are associated with the source in order to limit dispersion of flux emitted by the source.

17. Device according to claim 10, wherein the support comprises at least one smooth side part without any cellular structure, on which a control glue film is adapted to be applied identical to the glue film placed on said structure, and temperature measurement means placed facing said smooth lateral part.

18. Device according to claim 17, wherein an adhesive tape resistant to temperature is placed on the smooth side part, on which the control glue film is to be applied.

* * * * *